US010893433B2

(12) United States Patent
Martinez et al.

(10) Patent No.: US 10,893,433 B2
(45) Date of Patent: Jan. 12, 2021

(54) WIRELESS VEHICULAR COMMUNICATIONS INVOLVING RETRANSMISSION OF MESSAGES

(71) Applicant: NXP B.V., Eindhoven (NL)

(72) Inventors: Vincent Pierre Martinez, Roques (FR); Alessio Filippi, Eindhoven (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/451,745

(22) Filed: Jun. 25, 2019

(65) Prior Publication Data

US 2020/0015111 A1 Jan. 9, 2020

(30) Foreign Application Priority Data

Jul. 5, 2018 (EP) .................................... 18305883

(51) Int. Cl.
| | |
|---|---|
| *H04W 28/02* | (2009.01) |
| *H04W 4/46* | (2018.01) |
| *H04L 1/00* | (2006.01) |
| *H04L 1/08* | (2006.01) |
| *H04L 25/03* | (2006.01) |
| *H04L 29/08* | (2006.01) |
| *H04W 84/00* | (2009.01) |

(52) U.S. Cl.
CPC ......... *H04W 28/021* (2013.01); *H04L 1/0054* (2013.01); *H04L 1/08* (2013.01); *H04L 25/03057* (2013.01); *H04L 67/12* (2013.01); *H04W 4/46* (2018.02); *H04W 84/005* (2013.01)

(58) Field of Classification Search
None
See application file for complete search history.

(56) References Cited

U.S. PATENT DOCUMENTS

| | | |
|---|---|---|
| 2017/0230149 A1 | 8/2017 | Wang et al. |
| 2018/0048572 A1* | 2/2018 | Gulati ..................... H04L 47/12 |
| 2020/0120685 A1* | 4/2020 | Lee .................. H04W 74/0833 |

FOREIGN PATENT DOCUMENTS

| | | |
|---|---|---|
| WO | 2017197393 A1 | 11/2017 |
| WO | 2018030825 A1 | 2/2018 |
| WO | 2018030949 A1 | 2/2018 |

OTHER PUBLICATIONS

Khan, M., "Smart Retransmission and Rate Adaptation in WiFi", IEEE 23rd International Conference on Network Protocols, 2015.

* cited by examiner

Primary Examiner — Diane L Lo

(57) ABSTRACT

Embodiments are directed to methods and apparatuses for wireless vehicular communications involving retransmission of messages. A method for communicating by vehicular communications circuitry of a device includes, in a wireless communications network in which a message is broadcasted by vehicular communications circuitry of a device for asynchronous receptions by other circuitry in one or more devices configured to wirelessly communicate according to a communications protocol, monitoring a channel busy ratio associated with channels in a designated range of frequency pertaining to the wireless communications network. The method further includes assessing whether to retransmit the message as a function of the channel busy ratio, and in response to the channel busy ratio being outside a threshold, retransmitting the message according to the communications protocol.

20 Claims, 8 Drawing Sheets

WIRELESS VEHICULAR COMMUNICATIONS INVOLVING RETRANSMISSION OF MESSAGES

CROSS-REFERENCE TO RELATED APPLICATIONS

This application claims the priority under 35 U.S.C. § 119 of European Patent application no. 18305883.3, filed on 5 Jul. 2018, the contents of which are incorporated by reference herein.

OVERVIEW

Aspects of various embodiments are directed to apparatuses and methods for providing wireless vehicular communications including retransmission of messages.

Vehicle-to-everything (V2X) communications are used to pass information from a vehicle to another entity, and vice versa. As vehicles can be moving, V2X communications can form an ad-hoc network when two or more V2X devices come within each other's range. V2X communications can be provided using different types of technology which utilize communications protocols for providing wireless vehicular communications.

These and other matters have presented challenges to efficiencies of wireless vehicular communications implementations, for a variety of applications.

SUMMARY

Various example embodiments are directed to issues such as those addressed above and/or others which may become apparent from the following disclosure concerning vehicular communications circuitry of a device that wirelessly communicates by providing message retransmissions as a function of a channel busy ratio.

In certain example embodiments, aspects of the present disclosure involve vehicular communications circuitry of a device that uses a communications protocol and operates using an updated or newer standard or set of specifications than other devices in the field, and that provides for improved communication performance between devices by retransmitting a message as a function of a channel busy ratio. The vehicular communications circuitry can be implemented in a variety of types of devices, such as vehicles, mobile phones, tablets, user wearable devices, and other types of devices. In a more specific example embodiment, a method for communicating by vehicular communications circuitry of a device includes, in a wireless communications network in which a message is broadcasted by vehicular communications circuitry of a device for asynchronous receptions by other circuitry in one or more devices (e.g., vehicles or other devices) configured to wirelessly communicate according to a communications protocol, monitoring a channel busy ratio associated with channels in a designated range of frequency pertaining to the wireless communications network. The method further includes assessing whether to retransmit the message as a function of the channel busy ratio, and in response to the channel busy ratio being outside a threshold, e.g., below or above, retransmitting the message according to the communications protocol.

In more specific examples, the message is retransmitted in response to the channel busy ratio being below the threshold which is indicative of channel congestion, with the threshold being defined in the communications protocol. The channel busy ratio corresponds to a relative extent of spectrum use involving transmissions according to the communications protocol. The communications protocol can include a WiFi-based or 802.11p protocol. Retransmitting the message can increase at least one of a measure of message transmission range and a measure of message transmission reliability, relative to the message not being retransmitted.

In various specific embodiments, the other circuitry wirelessly communicates by using the communications protocol and operates according to a standard or a set of specifications. The method can further include broadcasting the message and retransmitting the message by the vehicular communications circuitry operating according to another standard or another set of specifications having improved features compared to the standard or set of specifications. The improved features can, for example, improve a robustness of the physical layer stack, which in turn can lead to (e.g., cause) an extended range of wireless communications between circuitries. The standard can include an older standard and the other standard includes a newer standard.

In various specific embodiments, the function of the channel busy ratio is provided for dynamic access by using at least one of a correlation look-up table stored in a nonvolatile memory and via a logic circuit executing a retransmission algorithm based on the monitored channel busy ratio. The step of assessing can include using a mapping that correlates multiple intervals of the channel busy ratio to different numbers of retransmissions of the message. The message can be retransmitted, once, twice, at least twice, or more, where each message is the same for the broadcast and for each retransmission. The message(s) can be retransmitted a threshold period of time after the broadcast of the message. In other embodiments, the message(s) can be retransmitted back-to-back with the broadcast of the message (e.g., zero back off time).

A number of embodiments include decoding the retransmissions by different vehicular communications circuitry. The method can include decoding, by at least one of the other circuitry that operates according to an older standard or set of specifications, the message in each broadcast as standalone messages and filtering duplicates of the standalone messages, wherein the vehicular communications circuitry operates according to a newer standard or set of specifications having improved features compared to the older standard or set of specification. The improved features can improve a robustness of the physical layer stack, which in turn can lead to (e.g., cause) an extended range of communications between circuitries. Example improved features include transmit or receive antenna diversity schemes, and/or spectrum emission mask (SEM) (e.g., more stringent SEM). In addition, the method includes using, by the at least one of the other circuitry that operates according to the older standard or set of specifications, the message among the standalone messages having a highest (e.g., best) quality and filtering the remaining duplicates of the message.

In other related embodiments and/or in addition, the method includes decoding, by at least one of the other circuitry that operates in accordance with a newer standard or set of specifications, the message in each broadcast as standalone messages and combining the standalone messages, wherein the newer standard or set of specifications has improved features compared to an older standard or set of specifications and the newer and older standards or sets of specifications are associated with common communications protocols. From the perspective of the newer standard receiver, the initial message and retransmissions can be combined at the equalized input level, equalized output level, log-likelihood ratio levels, and/or antenna data. For example, the standalone messages can be combined by performing at least one of: combining at an equalized symbol level, combining at an equalizer input level, combining at log-likelihood ratios (LLRs), and combining at antenna data. Additionally, the method can include determining, by the at least one of the other circuitry that operates in accordance with the newer standard or set of specifications, if incoming messages are retransmissions by performing at least one of: determining if the message is sent back-to-back with a previous message, comparing data in a preamble between messages (e.g., SIG symbol being identical), and/or comparing a scrambling sequence index of a data symbol between messages.

Other aspects are directed to a vehicular communications apparatus having first vehicular communications circuitry including at least one communications circuit. The first vehicular communications circuitry including the at least one communications circuit is configured in a device and configured to communicate wirelessly in a wireless communications network in which a message is broadcast for asynchronous receptions by other circuitry in one or more devices by: broadcasting the message for asynchronous receptions by the other circuitry in one or more devices configured to wirelessly communicate according to a communications protocol; monitoring a channel busy ratio associated with channels in a designated range of frequency pertaining to the wireless communications network; and assessing whether to retransmit the message as a function of the channel busy ratio. In response to the channel busy ratio being outside a threshold, the first vehicular communications circuitry retransmits the message according to the communications protocol.

In specific embodiments, the first vehicular communications circuitry retransmits the message in response to the channel busy ratio being below the threshold that is indicative of channel congestion, which increases at least one of a measure of message transmission range and a measure of message transmission reliability, relative to the message not being retransmitted, the threshold being defined in the communications protocol. Further, the first vehicular communications circuitry may not retransmit the message in response the channel busy ratio being above the threshold which is indicative of channel congestion.

In a number of embodiments, the first vehicular communications circuitry assesses whether a second message and a third message received from one of the other circuitry are part of a retransmission series. In response to determining the second and third messages are part of the retransmission series, the first vehicular communications circuitry decodes and combines, using an accumulator circuit, the second and third messages, wherein the first vehicular communications circuitry operates in accordance with a newer standard or set of specifications having improved features compared to an older standard or set of specifications operated by at least one of the other circuitry, and wherein both the newer and older standards or sets of specifications are associated with common communications protocols. The first vehicular communications circuitry can determine whether the second and third messages are part of the retransmission series by comparing data between the second and third messages.

In accordance with various embodiments, the first vehicular communications circuitry operating in accordance with the newer standard or set of specifications can skip (e.g., not decode) one or more messages in the retransmission series in response to receiving the respective message within a threshold time of receiving a previous message in the series, Using the above example, the first vehicular communications circuitry skips the third message in the retransmission series in response to the third message being received within the threshold time of receiving the second message.

In related embodiments, the apparatus further includes a second vehicular communications circuitry including at least one communications circuit configured in another device. The second vehicular communications circuitry is configured to communicate wirelessly in the wireless communications network by receiving and decoding, by the second vehicular communications circuitry that operates according to an older standard or set of specifications, the message and retransmitted message as standalone messages and filtering duplicates of the standalone messages. The first vehicular communications circuitry operates in accordance with the newer standard or set of specifications having improved features compared to the older standard or set of specifications.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
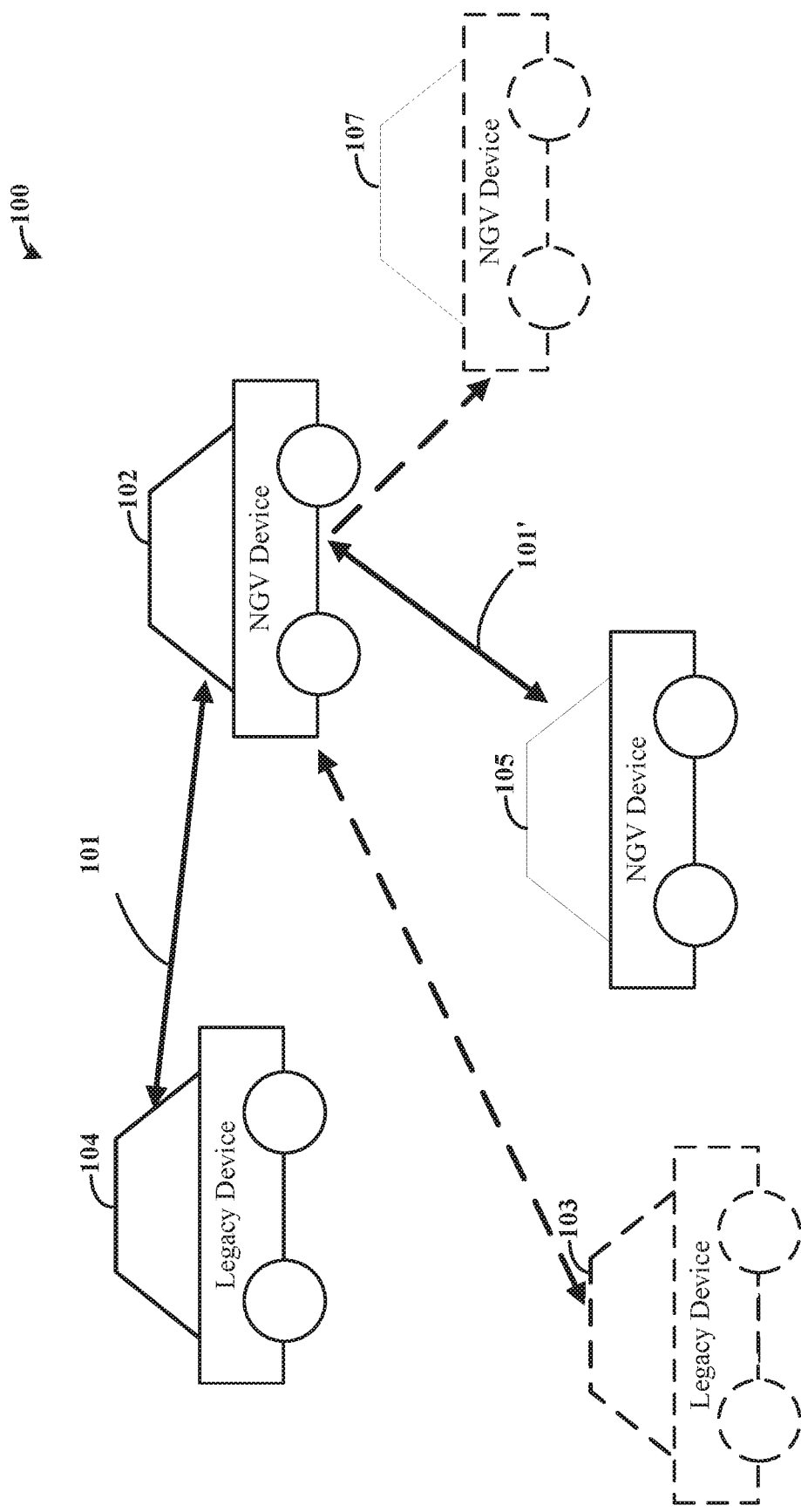
FIG. 1 illustrates an example wireless communications network, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless vehicular communications that provide retransmissions of messages. In certain implementations, aspects of the present disclosure have been shown to be beneficial when used in the context of retransmitting messages as a function of a channel busy ratio. In some embodiments, the retransmission improves system performance of both newer standard devices and older standard devices, while mitigating impacts to the older standard devices that may already be in the field. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Vehicles, such as automobiles, can include vehicular communications circuitry for wirelessly communicating with other vehicles and/or circuitry using vehicular communications protocol, sometimes herein referred to as vehicle-to-everything (V2X) communications. In some implementations, V2X technology can be dominated by WiFi-based technology, such as those in accordance with IEEE 802.11p. As an example, a vast number of automobiles that are currently in the field, and/or are about to be, provide communications via 802.11p, Such vehicles use a control channel of the V2X band that can include a 10 megahertz (MHz) chunk of the spectrum in the 5.9 gigahertz (GHz) range. As the lifetime of vehicles can be twenty years or more, V2X systems are in the field for a range (e.g., long) time, which can impact the ability to make improvements to wireless communications provided according to the standard. Further, a newer standard may not be implemented or compatible with the existing standard. Embodiments in accordance with the present disclosure can include use of a newer standard that is compatible with an older standard, and that provides improvement to system-level performance for both standards by retransmitting messages as a function of a channel busy ratio (CBR).

As a specific example, a new generation vehicle (NGV) standard can be used to improve system-level performance of an existing communications protocol and standard, IEEE 802.11p. The NGV features improve the overall system effectiveness, including the "legacy 802.11p" devices. As may be appreciated, legacy devices include or refer to devices in the field that provide V2X using an older standard, such as 802.11p. The newer standard is backwards compatible with the older standard, in order to avoid having two groups of devices (e.g., the legacy 802.11p devices and NGV devices) that are incompatible with each-other while in the field. For example, the newer standard or set of specifications can define a communications protocol that is the same or otherwise compatible with devices operating according to the older standard or set of specifications. The newer standard may improve performance of devices operating both the newer and older standards by improving a range and/or reliability of messages communications. From a physical layer perspective, the packet error rate (PER) is improved. The performance improvement is achieved by circuitry operating in accordance with the newer standard retransmitting the initial packet, which is understood by older standard devices (e.g., legacy 802.11p devices) as standalone messages and is understood by newer standard devices (e.g., NGV devices) by combining messages during the decoding chain.

The newer standard devices have vehicular communications circuitry used for providing the wireless communications according to a communications protocol. The communications protocol is consistent with, the same, or otherwise compatible with a communications protocol used by older standard devices. The newer standard device monitors a CBR of a wireless communications network and provides one or more retransmissions of a message in response to the CBR being outside a threshold. The threshold can be, for example, indicative of channel congestion. In some embodiments, the number of retransmissions, e.g., zero, one, two, three, or more, is a function of the CBR such that additional retransmissions are provided when the CBR is outside (e.g., below) one or more additional thresholds. Both the older and newer standard devices can see a performance boost in response to the one or more retransmissions. For example, older standard devices can select the best quality message among the initial message and the retransmission(s). The newer standard devices can combine the initial message and the one or more retransmissions during the decoding chain, leveraging even greater diversity gain than the older standard devices. Additionally, the older standard devices do not require modifications for the increased performance, allowing for compatibility with devices already in the field and/or without updates to the devices in the field. The older standard devices can continue to measure CBR according to their definitions, and no software change may be required. As a result of the newer standard devices sending the retransmissions, and thus sending more messages, the older standard devices can see an increase (e.g., small) in its measure of CBR, however, no additional changes may occur to the older standard devices as the possible duplicate messages are naturally filtered out by the upper layer stacks.

A number of specific embodiments are directed to methods, such as for communicating by vehicular communications circuitry of a device. The device can be in a wireless communications network and can broadcast a message by vehicular communications circuitry of the device for asynchronous receptions by other circuitry in one or more devices configured to wirelessly communicate according to a communications protocol. The method further includes monitoring a CBR associated with channels in a designated range of frequency pertaining to the wireless communications network. Based on the CBR, an assessment can be made on whether to retransmit the message as a function of the CBR. For example, in response to the CBR being below or above a threshold, the method further includes retransmitting the message according to the communications protocol. The threshold can be defined in the communications protocol and can be indicative of channel congestion.

CBR can typically be utilized for determining when to not communicate. The CBR can correspond to a relative extent of spectrum use involving transmissions according to the communications protocol, and involving transmissions by both older and newer standard devices. By retransmitting in response to the CBR being outside the threshold, system performance is improved while mitigating issues caused by the additional channel congestion as the retransmissions only occur when channel occupancy is outside the threshold (e.g., is low enough).

The communications protocol can include a WiFi-based or 802.11p-based protocol and retransmitting the message increases at least one of a measure of message transmission range and a measure of message transmission reliability, relative to the message not being retransmitted. At least one of the other circuitry can wirelessly communicate using the communications protocol and operate according to a standard or set of specification, such as an older (e.g., legacy) standard. The vehicular communications circuitry broadcasts the message, and optionally, retransmits the message by operating according to another standard or set of specifications having improved features compared to the standard, such as a newer standard that provides the improved features over an older standard. The improved features can improve a robustness of the physical layer stack, which in turn can cause or lead to an extended range of wireless communications between circuitries, and which the newer standard can provide for both the older standard devices and newer standard devices via the retransmission of messages. As a specific example, the newer standard devices retransmit the same 802.11p packets as the older standard devices, but more times (e.g., one or more retransmissions) according to the CBR measurement.

In a number of embodiments, the function of the CBR can be provided by the vehicular communications circuitry dynamically accessing the function using one of a correlation look-up table stored in a nonvolatile memory and via a logic circuit executing a retransmission algorithm based on the monitored CBR. For example, the look-up table can include a mapping that correlates multiple intervals of the CBR to different numbers of retransmissions of the message. In specific embodiments, the message is retransmitted at least twice, although embodiments are not so limited and can include no retransmissions, one retransmission, three retransmissions, and more. The message is the same for each of the broadcast and each retransmission.

The messages can be retransmitted back-to-back or with a variable time between. In some embodiments, there is no time between the message and the one or more retransmissions, such that the message and each retransmission is back-to-back. In other embodiments, the message is retransmitted a threshold period of time after the initial broadcast of the message. For example, the retransmissions can follow the carrier-sense multiple access (CSMA) protocol with a variable back-off time between the message and the retransmission and/or between each retransmission.

As described above, the newer and older standard devices can decode the retransmissions differently. Vehicular communications circuitry that operates according to the older standard or set of specifications can decode the message in each broadcast as standalone messages and possible message duplicates are naturally filtered by the upper layer stacks.

Vehicular communications circuitry that operates in accordance with the newer standard or set of specifications can decode the message in each broadcast as standalone messages and combine the standalone messages. The series of messages (e.g., standalone messages) can be combined by performing at least one of: combining at an equalized symbol level, combining at an equalizer input level, combining at log-likelihood ratios (LLRs), and combining at antenna data. Additionally, the vehicular communications circuitry that operates in accordance with the newer standard or set of specifications can determine if incoming messages are retransmissions by determining if the message is sent back-to-back with a previous message, comparing data in a preamble between messages (e.g., SIG symbol being identical), and/or comparing a scrambling sequence index of a data symbol between messages.

A number of specific embodiments are directed to vehicular communications apparatus having first vehicular communications circuitry including at least one communications circuit. The first vehicular communications circuitry is configured in a device and communicates wirelessly in a wireless communications network in which a message is broadcasted for asynchronous receptions by other circuitry in one or more devices. For example, the first vehicular communications circuitry broadcasts the message for asynchronous reception by the other circuitry in one or more devices configured to wirelessly communicate according to a communications protocol, monitors the CBR associated with channels in a designated range of frequency pertaining to the wireless communications network, and assesses whether to retransmit the message as a function of the CBR. In response to the CBR being outside a threshold, the message is retransmitted according to the communications protocol.

In a number of embodiments, the first vehicular communications circuitry retransmits the message in response to the CBR being below the threshold that is indicative of channel congestion, which increases at least one of a measure of message transmission range and a measure of message transmission reliability, relative to the message not being retransmitted, the threshold being defined in the communications protocol. Further, the first vehicular communications circuitry may not retransmit the message in response to the channel busy ratio being above the threshold which is indicative of channel congestion.

In a specific example, the first vehicular communications circuitry assesses whether a second message and a third message (and optionally more) received from one of the other circuitry are part of a retransmission series, e.g., are duplicates. In response to determining the second and third messages are part of the retransmission series, the first vehicular communications circuitry decodes and combines, using an accumulator circuit, the second and third messages, wherein the first vehicular communications circuitry operates in accordance with the newer standard or set of specifications having improved features compared to the older standard or set of specifications operated by at least one of the other circuitry. Both of the newer and older standards or sets of specifications can be associated with common communications protocols. The first vehicular communications circuitry can determine whether the second and third messages are part of the retransmission series by comparing data between the second and third messages (e.g., back-to-back, SIG symbol, or scrambling sequence).

In a number of specific embodiments, the first vehicular communications circuitry operating in accordance with the newer standard or set of specifications can skip (e.g., not decode) one or more messages in the retransmission series in response to receiving the respective message within a threshold time of receiving a previous message in the series. Using the above example, the first vehicular communications circuitry skips the third message in the retransmission series in response to the third message being received within the threshold time of receiving the second message. The content of the third message, in such embodiments, may not be of interest as the third message was received within the threshold time, e.g., shortly after, the second message. Skipping the message can save power consumption at the receiver side.

Although the above describes receiving a second message and a third message, and the third message being a retransmitted duplicate of the second message, embodiments are not so limited. For example, the second message may not be retransmitted or can be retransmitted once, twice, three times, four times, and more, in various embodiments and as further described herein.

In related embodiments, the apparatus further includes second vehicular communications circuitry (e.g., legacy 802.11p user) including at least one communications circuit configured in another device. The second vehicular communications circuitry operates according to the older standard or set of specifications and is configured to communicate wirelessly in the wireless communications network by receiving and decoding the message and the retransmitted message as standalone messages and filtering duplicates of the standalone messages (which are naturally filtered by the upper layer stacks). The first vehicular communications circuitry operates in accordance with the newer standard or set of specifications having the improved features compared to the older standard or set of specifications.

Turning now to the figures, FIG. 1 illustrates an example wireless communications network, in accordance with the present disclosure. As illustrated, the wireless communications network 100 includes a plurality of vehicles 102, 103, 104, 105, 107, each of which includes vehicular communications circuitry used to transmit messages according to a communications protocol.

The wireless communications network 100 includes a V2X network used to provide V2X communications. V2X communications include four types of communications: vehicle-to-vehicle (V2V), vehicle-to-infrastructure (V2I), vehicle-to-network, (V2N) and vehicle-to-pedestrian (V2P). In specific instances, a V2X network may enable an exchange of information between a plurality of vehicles and, in some instances, other devices. As may be appreciated, as used herein "circuitry" refers to one or more circuits, such as a plurality of similarly-operating (or version of) circuits operating in respective vehicles. The vehicles can communicate messages to one another, such as speed measurements, communication measurements, GPS data, etc., via the vehicular communications circuits. Vehicles 102, 103, 104, 105, 107 may use V2V for a variety of use cases, such as emergency electronic brake light, emergency vehicle approaching notification or collision avoidance but not limited thereto, where both parties of the communication have circuitry equipped on different vehicles.

Although the embodiment of FIG. 1 illustrates a wireless communications network having vehicles only, embodiments are not so limited and the vehicular communications circuitry and/or vehicular communications apparatuses, as described herein, can be implemented in variety of different types of devices, such as vehicles, mobile phones, tablets, user wearable devices, and other devices. In a number of embodiments, the wireless communications network 100 can include a plurality of different types of devices, including vehicles, mobile phones, tablets, user wearable devices, and other devices, that each have vehicular communications circuitry used to provide V2X communications. In this context, the term "vehicular" in vehicular communications circuitry and/or vehicular communications apparatuses is not intended to be limiting to vehicle devices, but rather indicates or refers to circuitry and/or apparatuses used to provide vehicular-type communications, such as V2X communications.

Different vehicles and other types of devices may utilize different technologies for performing the V2X communications that operate using communications protocols. Many vehicles presently use IEEE 802.11p, with a number of vehicles in the field, or about to be in the field, using such technology. Such devices are herein referred to as legacy devices, which can include or refer to legacy 802.11p devices, or other older protocols in use. Newer standards may be implemented that have improved features over the older standard, such as features that improve a robustness of the physical layer stack, which in turn can cause or otherwise lead to an extended range of communication between circuits. It can be advantageous to have the newer standard compatible with the older standard so that newer standard devices and older standard devices can communicate. As noted above, the older standard devices may be in the field for twenty or more years and it can be difficult to provide updates to all vehicles (or other types of devices) in the field.

As a specific example, a first plurality of vehicles 102, 105, 107 use a technology according to a newer standard to communicate (e.g., NGV devices) and a second plurality of vehicles 103, 104 use the older standard to communicate (e.g., legacy devices). In some instances, one or more of the different technologies may communicate using common communications protocols such that the devices can communicate between one another. For example, the newer standard devices (e.g., the first plurality of vehicles 102, 105, 107) can transmit the same 802.11p packets as the older standard devices (e.g., the second plurality of vehicles 103, 104). The newer standard devices may increase performance in the wireless communications network 100, for both the newer standard and older standard devices by retransmitting messages as a function of CBR 101, 101'.

Both technologies can be a WiFi-based or 802.11p-based technology, such as IEEE 802.11p. The label 802.11p or WiFi is sometimes used throughout the text referring to when the dot11OCBActivated is set to true enabling communication outside the context of a BSS in IEEE 802.11-2016. Each of the newer standard and older standard devices (e.g., vehicles 102, 103, 104, 105, 107) have communications circuitry that wirelessly communicate using a communications protocol that is consistent with WiFi or 802.11p-based communications. The communications protocol allows for messages to be sent asynchronously. For example, communications circuitry can observe (e.g., listen) the channel and communicate in response to the channel being clear no messages being transmitted).

The newer standard devices (e.g., communications circuitry of a device operating in accordance with the newer standard) improve the system performance by providing the retransmissions of a broadcasted message, and which mitigates potential channel congestion issues caused by the retransmissions by retransmitting as a function of the CBR. As may be appreciated, CBR is associated with channels in the designated range of frequency pertaining to the wireless communications network 100. The newer standard devices can assess whether to retransmit a message by monitoring the CBR and retransmitting the message only when the CBR is outside a threshold indicative of channel congestion, as further described herein.

Figure 2:
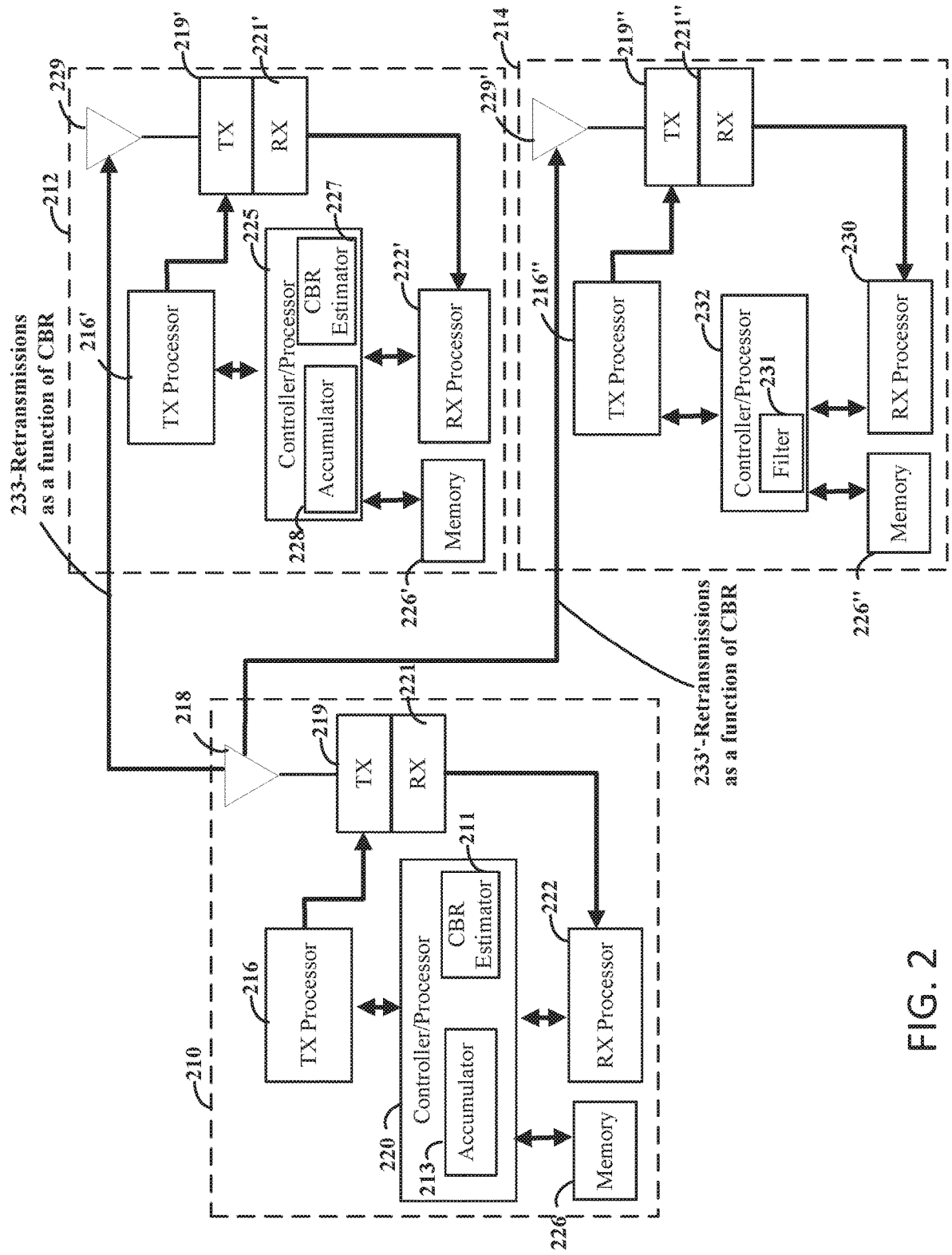
FIG. 2 illustrates example vehicular communications circuitry of a plurality of devices, in accordance with various embodiments.

FIG. 2 illustrates example vehicular communications circuitry of a plurality of devices, in accordance with various embodiments. Each of the vehicular communications circuitries 210, 212, 214 can communicate wirelessly in a wireless communications network via a WiFi-based or 802.11p-based communications protocol by transmitting data over a channel, which is received by other circuitry in a shared device geography. More specifically, FIG. 2 illustrates first vehicular communications circuitry 210 and second vehicular communications circuitry 212 that operate according to a newer standard and third vehicular communications circuitry 214 that operates according to an older standard.

As illustrated, the vehicular communications circuitries 210, 212, 214 include common circuitry. For ease of reference, only each of the first vehicular communications circuitry 210 components, which include at least one communications circuit, are described, although as may be appreciated, each of the vehicular communications circuitries 210, 212, 214 include similar components. The first vehicular communications circuitry 210 includes a transmit (TX) processor 216 and receive (RX) processor 222 used to implement various functionality for transmitting and receiving messages in accordance with the communications protocol. As may be understood by one of ordinary skill, the TX processor 216 can map to signal constellations based on various modulation schemes (e.g., binary phase-shift keying, quadrature phase-shift keying, M-phase-shift-keying, etc.). The coded and modulated symbols are mapped to an orthogonal frequency-division multiplexing (OFDM) subcarrier and used to produce a physical channel carrying a time domain OFDM symbol stream. The stream is provided to the antenna 218 via a transmitter (TX) 219.

The receiver (RX) 221 receives a signal through the antenna 218. Although the embodiments illustrate a single antenna, embodiments are not so limited and can include separate RX and TX antennas and/or different antennas for different streams. The RX 221 recovers data modulated onto the RF carrier and provides the data to the RX processor 222, which may perform spatial processing on the data to recover spatial streams (e.g., an OFDM data symbol stream). The RX processor 222 converts the OFDM data symbol stream from the time-domain to the frequency domain using a Fast Fourier Transform (FFT) and uses the same to recover data and control signals which are provided to the controller/processor 220. The controller/processor 220 processes data received in the data messages and can be associated with memory 226 that stores program codes and data.

In various embodiments, the first vehicular communications circuitry 210 further includes an accumulator circuit 213 (such as an LLR or EQ accumulator circuit) and a CBR estimator circuit 211. The CBR estimator circuit 211 can monitor a CBR, which is used for assessing whether or not to provide retransmissions of a message. The accumulator circuit 213, as further described herein, is used to combine duplicate messages (e.g., the broadcasted initial message and retransmissions of the message), thereby improving system performance.

Similarly to that described above, the third vehicular communications circuitry 214, which operates in accordance with the older standard, includes a TX processor 216" and an RX processor 230 used to implement various functionality for transmitting and receiving messages in accordance with the communications protocol, e.g., a WiFi-based communication (e.g., IEEE 802.11p). Data messages are provided by the TX processor 216" to the antenna 229' for wirelessly communicating data via the TX 219". The RX 221" receives a signal through the antenna 229' and provides recovered data to the RX processor 230, similarly to that described above and as would be appreciated by one of ordinary skill. The RX processor 230 converts the data stream to recover the data and provides the same to the controller/processor 232. The controller/processor 232 processes data received in data messages and can be associated with memory 226" that stores program codes and data. The upper level stacks of the device having the third vehicular communications circuitry 214, herein referred to as an older standard device for ease of reference, further includes a filter 231 used to filter out duplicates of the message. As further described herein, the older standard device, via the upper level stacks, can select a message among the duplicates having the best quality and filter the remaining duplicates.

Each of the first, second, and third vehicular communications circuitries 210, 212, 214 communicates wirelessly using the communications protocol in which messages are sent asynchronously and over the same channel. The messages sent using the communications protocol can each have a preamble that includes a legacy short training field (L-STF) that provides support of synchronization and automatic gain control (AGC) calibration e.g., which can be 16 usec), a legacy long training field (L-LTF) that provides channel estimation pilot for decoding subsequent WiFi-based symbols (e.g., 802.11p OFDM symbols and which can be 16 usec), and a signal field (SIG) symbol that conveys the MCS (e.g., which can be 8 usec).

The first and second vehicular communications circuitry 210, 212 can operate according to the newer standard that is used to improve system performance by retransmitting messages as a function of CBR. The first vehicular communications circuitry 210 (as well as the second communications circuitry 212) can monitor the CBR associated with channels in the designated range of frequency pertaining to the wireless communications network using the CBR estimator circuits 211, 227. The first and second vehicular communications circuitry 210, 212 can assess whether or not to retransmit a message as function of the CBR, such as retransmitting in response to the CBR being below a threshold and not retransmitting in response to the CBR being above the threshold.

As a specific example, the first vehicular communications circuitry 210 broadcasts a message for asynchronous receptions by other circuitry (e.g., the second and third vehicular communications circuitry 212, 214) in one or more devices according to the communications protocol. The first vehicular communications circuitry 210 monitors the CBR associated with the channels in the designated frequency range of the wireless communications network using the CBR estimator circuit 211 and assesses whether to retransmit the message as a function of the CBR. In response to the CBR being outside the threshold, the first vehicular communications circuitry 210 retransmits the message 233, 233' according the communications protocol. Both the message and the retransmitted message 233, 233' are received by the second and third vehicular communications circuitry 212, 214.

The second vehicular communications circuitry 212 receives the message and the retransmitted message 233 via the antenna 229 and RX and the RX processor 222' converts the data streams to recover the data and provides the same to the controller/processor 225. In specific embodiments, the second vehicular communications circuitry 212 (via the RX processor 222' and/or controller/processor 225) decodes the message and the retransmitted message 233' as standalone messages and combines the standalone messages in response to determining the standalone messages are duplicates. For example, the second vehicular communications circuitry 212 can determine if the messages are duplicates by determining if the messages are sent back-to-back, comparing data in the preamble between messages (e.g., comparing SIG symbols and if identical, the messages are duplications), and/or comparing a scrambling sequence index of the data symbol between messages. In response to determining the message and retransmission are duplicates, the second vehicular communications circuitry 212 combines the standalone messages via the accumulator circuit 228. As further described below, the standalone messages can be combined by combining EQ input or output levels, combining LLRs, and/or combining antenna data.

As may be appreciated, the second vehicular communications circuitry 212 similarly monitors the CBR using a CBR estimator circuit 227, assesses whether to send retransmissions as a function of the CBR, and broadcasts messages and/or retransmissions using the TX 219' and TX processor 216'. Additionally, the first vehicular communications circuitry 210 can include an accumulator circuit 213 for combining duplicate messages. And, both the first and second vehicular communications circuitries 210, 212 can skip, e.g., not decode, one or more duplicate messages in the transmission series in response to receiving the one or more duplicate messages within a threshold time of a previous message in the transmission series, as further described herein.

Using the above-specific example, the third vehicular communications circuitry 214 receives the message and the retransmitted message 233' via the antenna 229' and RX 221", and the RX processor 230 converts the data streams to recover the data and provides the same to the controller/processor 232. The third vehicular communications circuitry 214 (via the RX processor 230 and/or controller/processor 232) decodes the message and the retransmitted message 233' as standalone messages. Upper level stacks of the older standard device having the third vehicular communications circuitry 214 can use the standalone message (e.g., between the message and retransmitted message 233') having a best quality, and can include a filter 231 used to filter out duplicates of the messages. Example quality measures include a signal strength, SNR values, and/or cyclic redundancy check (CRC) statuses.

As may be appreciated, networks are not limited to the number of devices and/or vehicular communications circuitries as illustrated by FIGS. 1-2. Various embodiments can include greater or fewer devices having vehicular communications circuitries in a shared device geography, additional types of devices having vehicular communications circuitries (e.g., mobile phones) and the number of devices can change over time due to movement of the vehicles or other device and/or additional device entering the shared device geography (e.g., forming ad-hoc network(s)). Similarly, and as described above, embodiments are not limited to one retransmission of a message, and can include zero, two, three, four, or more retransmissions. Although not illustrated, the third vehicular communications circuitry 214 can include a CBR estimator circuit used to monitor CBR according to its definitions. As noted above, as a result of the newer standard devices (e.g., the first and second vehicular communications circuitry 210, 212) sending the retransmission(s), and thus sending more messages, the older standard device can see an increase (e.g., small) in its measure of CBR.

Figure 3A:
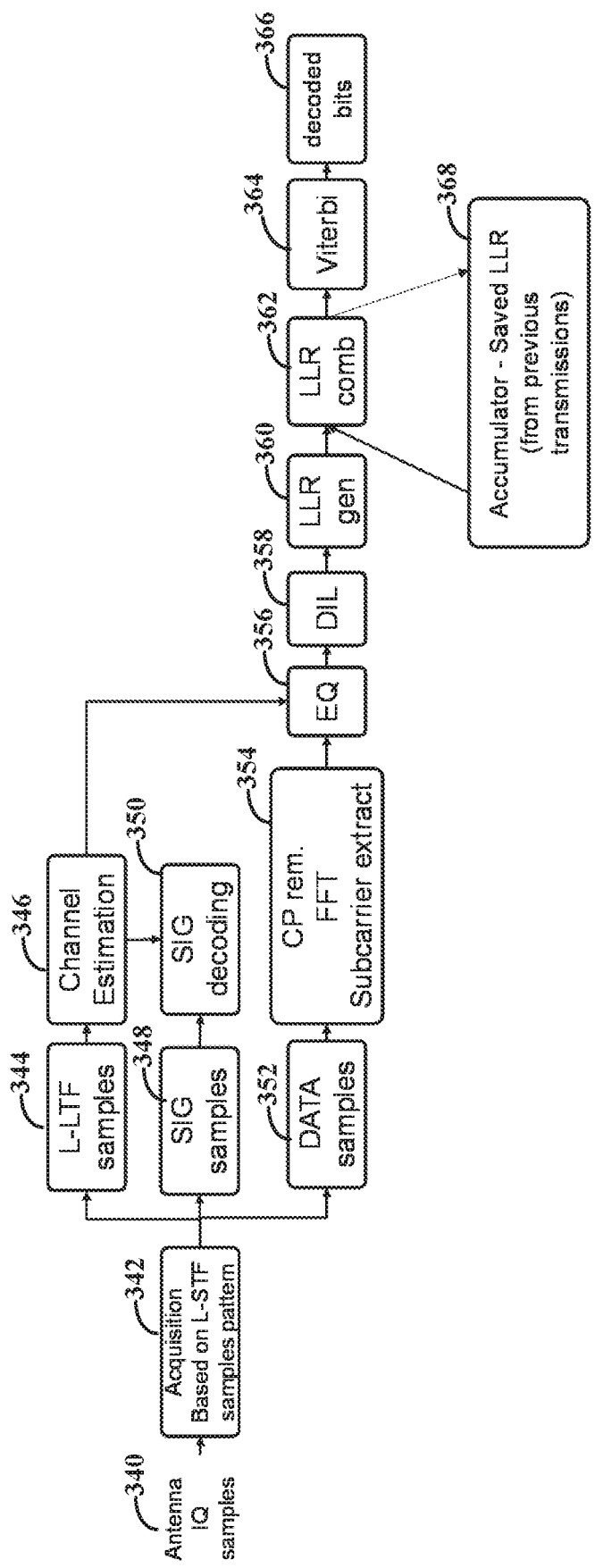
FIGS. 3A-3B illustrate example vehicular communications circuitry that operate according to a newer standard, in accordance with various embodiments.
Figure 3B:
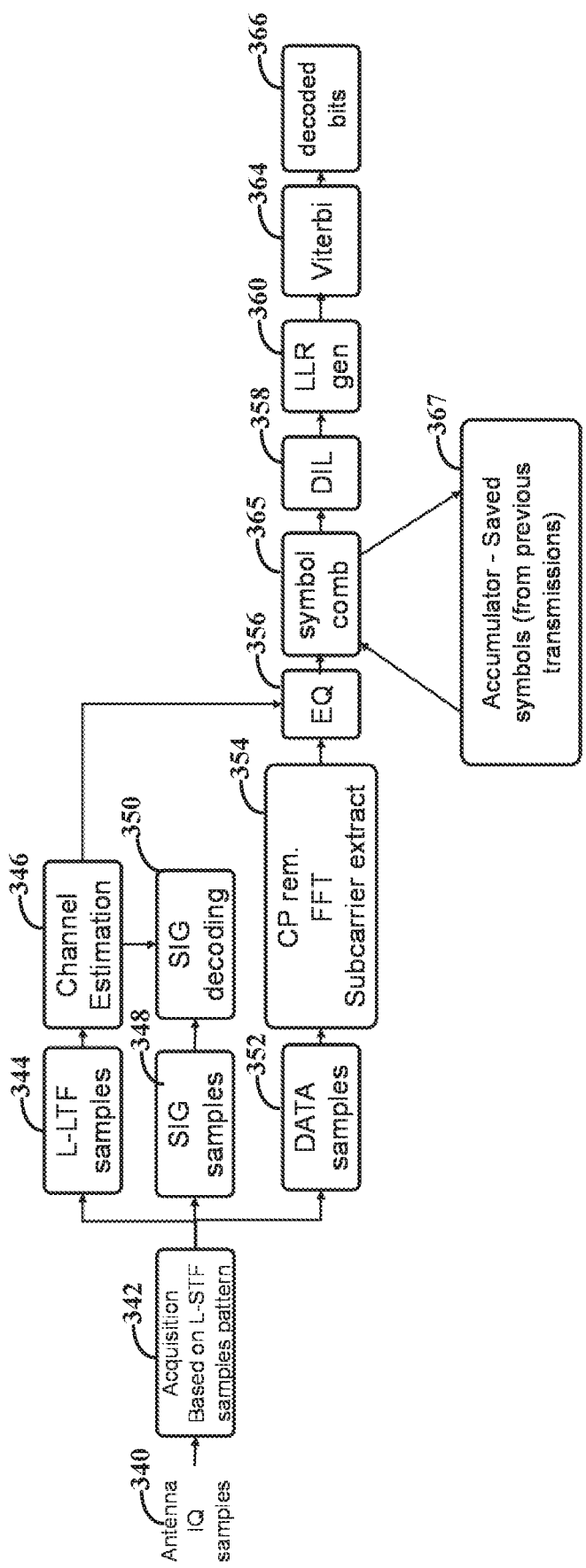

FIGS. 3A-3B illustrate example communications circuitry that operate according to a newer standard, in accordance with various embodiments. The newer standard can include a NGV standard for providing wireless communications using a communications protocol compatible with or otherwise the same as that used by an older standard, such as IEEE 802.11p in existing devices, e.g., vehicles. The NGV devices can, for instances, communicate 802.11p data packets.

As may be appreciated, the data can be transmitted based on an OFDM technique. OFDM divides the available band into subcarriers having separated frequency bandwidths. In IEEE 802.11p there are 64 subcarriers, with 48 of the subcarriers carrying data and 4 pilot subcarriers that transmit a fixed pattern used to mitigate frequency and phase offsets at the receiver side. Each of the 48 subcarriers can be modulated, such as via binary phase-shift keying, quadrature phase-shift keying, and M-phase-shift-keying. For example, prior to transmission, the transmitter side can reorder and interleave the bits for a desired data rate. Each bit is then mapped into a complex number according to the modulation type and subdivided into the 48 subcarriers and 4 pilot plot subcarriers. The receiver side divides the signal into blocks of samples and separates the data field from the preamble (e.g., L-STF, L-LTF, and SIG) fields. The channel coefficients are estimated based on the preamble fields and based on the channel coefficients, an equalizer compensates the fading effects introduced by the channel and transmits the samples for data detinterleaving and demapping, and then to the decoder circuit for decoding the data bits.

The following illustrates a specific example of a receiver side receiving data. As previously described, messages transmitted according to the communications protocol have a preamble including the L-STF, L-LTF, and SIG. At 340, the receiver side provides time-domain in-phase/quadrature (IQ) samples from a transmitted message as received by the antenna, and which are acquired, at 342, based on L-STF samples pattern. For example, an RF signal received through the antenna is converted into a time-domain signal by digitizing the RF signal to produce the samples.

The I/Q samples are divided into L-LTF samples, at 344, SIG samples, at 348, and data samples, at 352, by the vehicular communications circuitry (e.g., by the RX processor). The L-LTF samples are used to perform channel estimation, at 346, and the channel estimation is input to the digital equalizer (EQ) 356. For example, the L-STF can include course synchronization information and the L-LTF includes finer synchronization information and/or channel estimation information, such as a type of modulation technique used. The SIG samples are decoded, at 350, using the channel estimation, to provide transmission parameters. The data samples 352 are brought back into the frequency domain using a FFT 354 (e.g., the time-domain signal is converted into a frequency-domain signal using the FFT).

The short term fast fades, especially those denoted as frequency selective fades, are corrected for in the EQ 356, the EQ 356 being a rake receiver, a decision feedback equalizer (DFE), or any other form of equalization designed to deal with this type of fading. After equalization, the data, e.g., the equalized symbols, is further processed in the decoding blocks using decoding schemes as described herein.

In some specific embodiments, the equalized symbols are deinterleaved and demapped by a deinterleaver circuit (DIL) 358 and by a Likelihood Ratio (LLR) generator 360 that generates LLR values. The LLR values can be saved in an accumulator circuit 368 (e.g., an LLR accumulator circuit). As may be appreciated, LLR values are typically generated by a soft symbol demapper circuit, which takes as an input, for example, the output of the DIL circuit 358. In some implementations, and for some symbol constellations (for example, quadrature phase-shift keying), zeroing out the input of the soft symbol demapper or its outputs is equivalent. In some other implementations, zeroing out the input of the soft symbol does not lead to zero-valued LLR.

In a number of embodiments, as described above, a message can be retransmitted to improve system performance. The accumulator circuit 368 saves the combined LLRs from previous transmissions, and which are combined by the LLR combination circuit 362. In a number of embodiments, the vehicular communications circuitry determines if the message is a retransmission, as previously described. In response to determining the message is a retransmission, the accumulator circuit 368 provides previously determined LLR values to the LLR combination circuit 362. The LLR combination circuit 362 provides the combined (or not) LLR values to the Viterbi decoding circuit 364, which provides decoded data bits 366.

FIG. 3B illustrates another example vehicular communications circuitry that operates according to a newer standard, and which include similar circuitry to that described by FIG. 3A. The various circuitry illustrated by FIG. 3B can include common circuitry with that illustrated by FIG. 3A and the various circuitry and steps are not repeated for ease of reference. Although as may be appreciated, a least some of the circuitry is different, and/or located at different locations. For example, the message and retransmissions of the message are combined at the equalized symbol level by the circuitry illustrated by FIG. 3B, rather than the LLR level as shown by the circuitry illustrated by FIG. 3A.

As illustrated by FIG. 3B, the equalized symbols are input to an EQ combination circuit 365 which is communication with an accumulator circuit 367 (e.g., an EQ accumulator circuit). The accumulator circuit 367 saves equalized symbols from previous transmissions, and which are combined by the EQ combination circuit 365 and subsequently decoded by the Viterbi decoding circuit 364 for providing decoded data bits 366. Although FIG. 3B illustrates combining at the EQ output level, various embodiments can include combining at the EQ input level.

Combining the LLR values, EQ input or output level across multiple message broadcast, e.g., the original broadcast and one or more retransmissions, as a function of CBR can increase system performance by leveraging diversity gain as compared to not retransmitting the original message. Combining of the messages is performed in the digital domain, after channel estimation and before decoding, for example, as illustrated by the embodiments of FIGS. 3A-3B.

Figure 4:
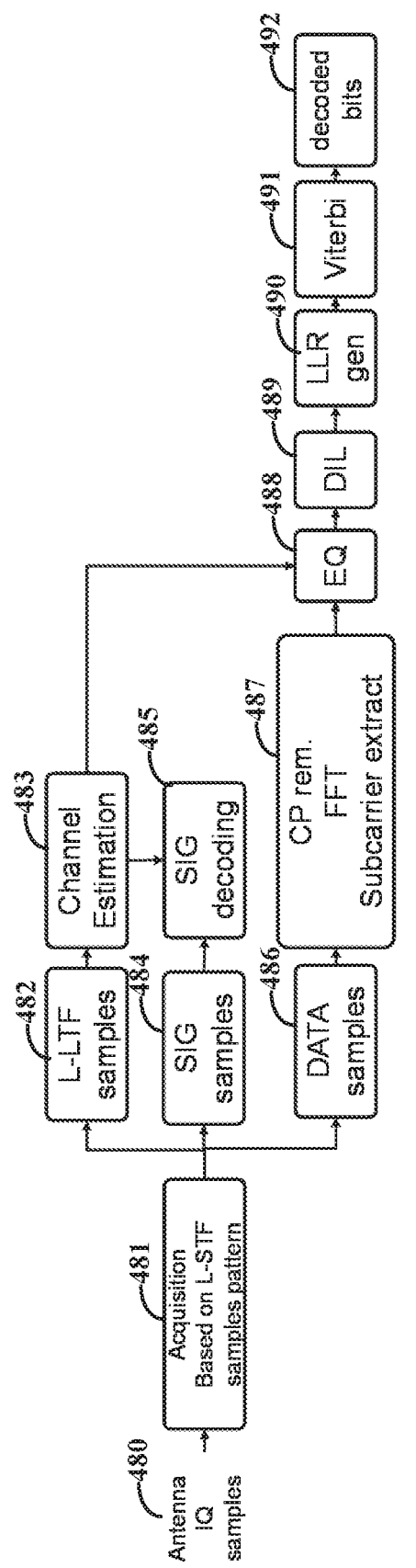
FIG. 4 illustrates an example vehicular communications circuitry that operates according to an older standard, in accordance with various embodiments.

FIG. 4 illustrates an example vehicular communications circuitry that operates in accordance with an older standard as compared to the newer standard, in accordance with various embodiments. The circuit components include similar circuitry to that illustrated and described in connection with FIGS. 3A-3B.

Similarly to the above, messages transmitted according to the communications protocol have a preamble including the L-STF, L-LTF, and SIG. In some instances, a message is broadcasted and subsequently one or more retransmissions of the message are provided as a function of CBR. The vehicular communications circuitry illustrated by FIG. 4 can select the message having the best quality of the transmissions, which can improve system performance. At 480, the receiver provides IQ samples from a transmitted message as received by the antenna, and which are acquired, at 481, based on L-STF samples pattern. The I/Q samples are divided into L-LTF samples, at 482, SIG samples, at 484, and data samples, at 486, by the vehicular communications circuitry. The L-LTF samples are used to perform channel estimation, at 483, and the channel estimation is input to the EQ 488. The SIG samples are decoded, at 485, using the channel estimation, to provide transmission parameters. The data samples 486 are brought back into the frequency domain using a FFT 487.

The short term fast fades are corrected for in the EQ 488. The equalized symbols are deinterleaved and demapped by the L-LTF 489 and by the LLR generator 490 that generates LLR values. The LLR values are input to the Viterbi decoding circuit 491, which provides the decoded the data bits 492, as previously described.

In a number of embodiments, as described above, a message can be retransmitted to improve system performance. The upper level stacks of vehicular communications circuitry that operates in accordance with the older standard, as illustrated by FIG. 4, can select the transmitted initial message or one of the retransmitted messages based on a quality measure. For example, the selected message can include the best or highest quality message among each transmission, as previously described.

Figure 5:
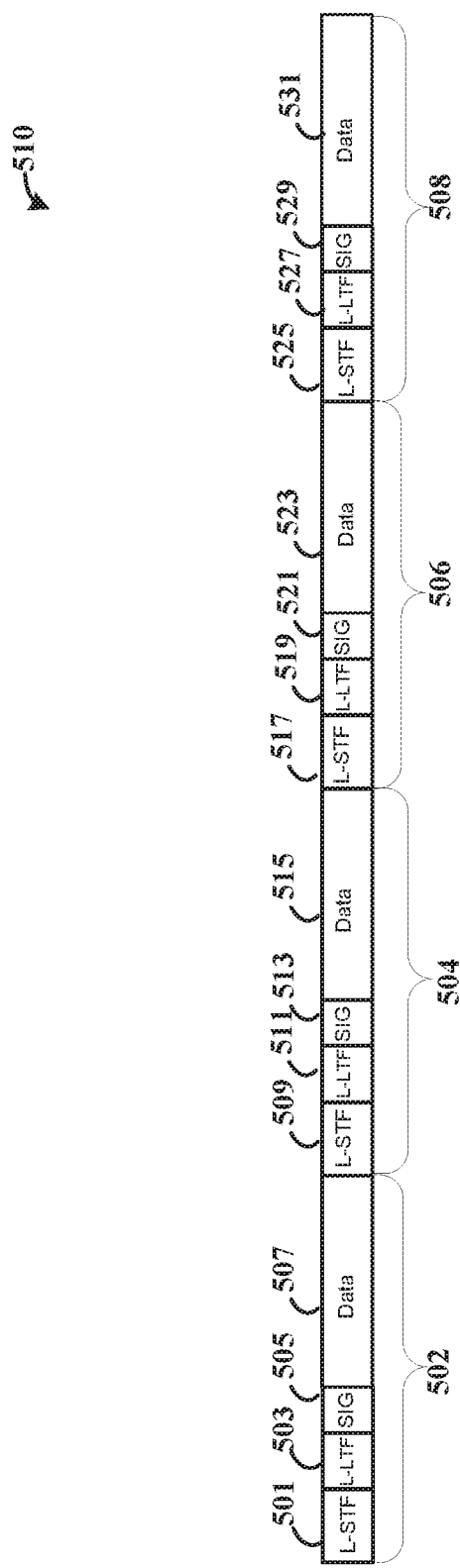
FIG. 5 illustrates example data communicated by an apparatus and as received by other circuitry, in accordance with various embodiments.

FIG. 5 illustrates example data communicated by an apparatus and as received by other circuitry, in accordance with various embodiments. The data includes a data packet 510 having multiple transmissions of the same message. For example, the data packet 510 includes an initial message 502, and three retransmissions 504, 506, 508 of the same message. Each message 502, 504, 506, 508 includes an L-STF 501, 509, 517, 525, a L-LTF 503, 511, 519, 527, a SIG 505, 513, 521, 529, and data 507, 515, 523, 531.

As illustrated, the initial message 502 is retransmitted one or more times. The retransmission(s) 504, 506, 508 can be in response to a monitored CBR being outside (e.g., below) a threshold indicative of channel congestion. For example, and not intended to be limiting, a CBR of 65 percent or more can indicate channel congestion. The retransmissions 504, 506, 508 of the initial message 502 may not occur in response to the CBR being above threshold. In instances in which the CBR is outside (e.g., below) the threshold, one or more of the retransmissions 504, 506, 508 are provided.

In various embodiments, as illustrated by FIG. 5, the initial message 502 and the retransmissions 504, 506, 508 are broadcast back-to-back, e.g., with no gap between. However, embodiments are not so limited, and the retransmissions 504, 506, 508 can be provided following the CSMA protocol with a variable listen and back-off time between the message broadcast of the initial message 502 and the first retransmission 504, and between each of the retransmissions 504, 506, 508.

In these and other embodiments, differences between the older and newer vehicle-related standards may be revisions in the newer standard, as compared to the older standard, being additional communication features and/or improved specifications, such as transmit or receive antenna diversity schemes, and more stringent spectrum emission mask (SEM).

The newer and older standards may treat the initial message 502 and the retransmissions 504, 506, 508 differently. Vehicular communications circuitry operating in accordance with the older standard treat each of the messages 502, 504, 506, 508 as standalone messages, and the physical layer stack may not understand that each message 502, 504, 506, 508 forms a series and/or are duplicates of one another. Upper level stacks/applications of devices having the vehicular communications circuitry operating in accordance with the older standard, e.g., 802.11p, can select a respective message of the data packet 510 with the highest quality, such as using one of the initial message 502 and the retransmissions 504, 506, 508 with the best quality. The duplicate messages, of lower quality, can be (naturally) filtered out by the upper layer stacks/applications. Performance is improved for older standard devices due to channel temporal diversity and retry. An example improvement for older standard devices can include an improvement of 1 to 2 dB, depending on the fading and propagation channel, although embodiments are not so limited. Vehicular communications circuitry that operates according to the older standard or set of specifications decodes the message in each broadcast as standalone messages and the upper level stacks filter duplicates of the standalone messages.

Vehicular communications circuitry operating in accordance with the newer standard, e.g., NGV, can combine each of the initial message 502 and the retransmissions 504, 506, 508. More specifically, the vehicular communications circuitry operating in accordance with the newer standard can determine if the retransmissions 504, 506, 508 are duplications of the initial message 502. The determination can be based on the messages 502, 504, 506, 508 being sent back-to-back with one or more messages, the content of the SIG in the messages 502, 504, 506, 508 being identical, and/or if the scrambling sequence index of the data symbols of the messages 502, 504, 506, 508 are identical. In response to determining the one or more messages 502, 504, 506, 508 are duplications, the vehicular communications circuitry decodes each message as standalone messages and combines each of the standalone messages. The messages 502, 504, 506, 508 can be combined at an equalized symbol level, an equalizer input level, LLR level, and/or at antenna data. The performance improvement for newer standard devices can be dependent on the number of retransmissions, such as a 4 decibel (dB) performance boost for one retransmission and a 7 dB performance boost for three retransmissions, depending on the fading and propagation channel, although embodiments are not so limited.

As a specific example using the data packet 510, an older standard device receives the data packet 510 having a plurality of messages 502, 504, 506, 508 that are duplicates of one another. Each of the messages 502, 504, 506, 508 are decoded as standalone messages, e.g., four individual messages. Possible duplicates are filtered via the upper layer stacks/applications. A newer standard device receives the data packet 510 and similarly decodes the first message 502 as standalone, and the rest of the message series 504, 506, 508 are combined at the physical layer. While decoding, an accumulator circuit accumulates LLR values, EQ inputs, and/or EQ outputs, and sequentially decodes from the combined LLR values, EQ inputs, and/or EQ outputs.

Using LLRs as a specific example, the newer standard device receives the initial message 502, decodes as a standalone message, and saves the LLR values in the LLR accumulator circuit. The first retransmission 504 is received. The LLR values from the first retransmission 504 are combined with the LLR values from the accumulator circuit (which holds only the combined LLR values from the initial message 502), and the combined LLR values are saved in the accumulator circuit and provided to the decoder circuitry (e.g., Viterbi decoder circuit) for decoding data bits. The second retransmission 506 is received. The LLR values from the second retransmission 506 are combined with the combined LLR values from the accumulator circuit (which is the result of combining the LLR values of the initial message 502 and the first retransmission 504), saved in the accumulator circuit, and decoded, And, the third retransmission 508 is received. The LLR values from the third retransmission 508 are combined with the combined LLR values from the accumulator circuit (which is the result of combining the LLR values of the initial message 502, the first retransmission 504, and the second retransmission 506) and decoded.

In a number of specific embodiments, the newer standard devices can determine to skip one or more of the messages in the series (e.g., a duplicate) if the respective message is received within a threshold period of time of a previous message in the series. For example, if a newer standard device successfully decodes a message, for example, based on CRC criteria, and within a threshold period of time (e.g., just after), receives a retransmission belonging to the same series of messages, the newer standard device can skip the message (e.g., the latest message received in the series or that is a duplicate). The content of such a message may not be of interest as the message was received within the threshold time, e.g., shortly after, another message. Skipping, e.g., not decoding, the message can save power consumption at the receiver side.

Various embodiments can include different numbers of retransmissions as a function of the CBR. For example, a mapping can correlate multiple intervals of CBR, which are below the threshold, to different numbers of retransmissions of the message. In a specific example, the exact same message is retransmitted one, two, three, or more times, depending on the CBR and based on the mapping. The following includes an example mapping:

| CBR | Number of retransmissions | Traffic increase (v. 802.11p) |
|---|---|---|
| ≥0.6 | 0 | x1 |
| [0.3-0.6] | 0 or 1 * | x1 to x2 |
| [0.2-0.3] | 1 | x2 |
| [0.15-0.2] | 2 | x3 |
| <0.15 | 3 | x4 |

* Number of retransmissions = 0 or 1
Retransmission = random value with probability of retransmission = p = (0.6-CBR)/0.3
For example, CBR = 0.30 → p = (0.60 − 0.30)/0.3 = 0.3/0.3 = 1
For example, CBR = 0.15 → p = (0.60 − 0.45)/0.3 = 0.15/0.3 = 0.5
For example, CBR = 0.60 → p = (0.60 − 0.60)/0.3 = 0/0.3 = 0.

The above-provided mapping is provided as an example and is not intended to limit the application. For example, a mapping can include more or fewer intervals of CBR, different intervals, and/or different numbers of retransmissions, among other variations.

Figure 6:
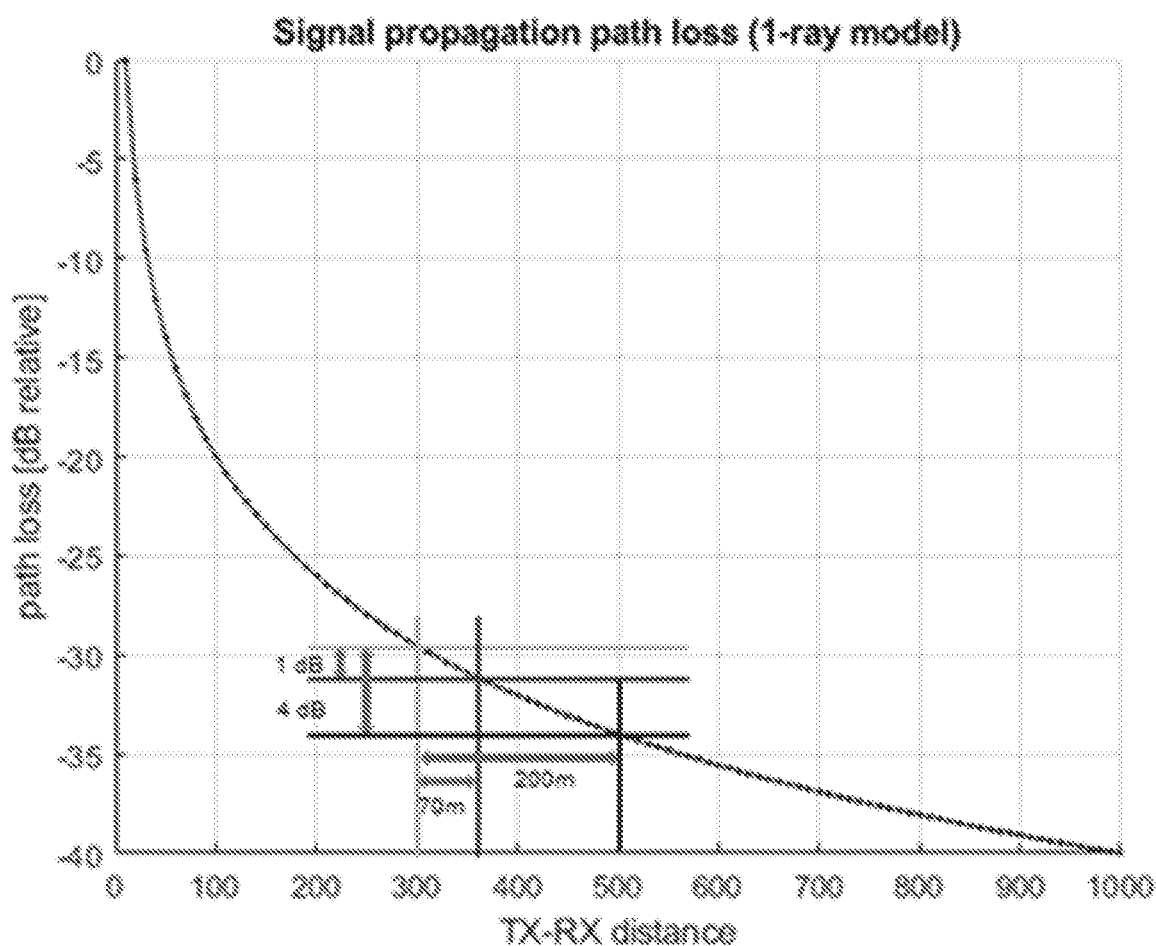
FIG. 6 is a graph illustrating example propagation path loss, in accordance with various embodiments.

FIG. 6 is a graph illustrating example propagation path loss, in accordance with various embodiments. As a specific example, using a 1-ray model for signal propagation model, improving PER by 1 or 4 dB can translate into an increased range from 300 meters to 370 and 500 meters respectively. The performance improvement is achieved by circuitry operating in accordance with the newer standard retransmitting the initial message, which is understood by older standard devices (e.g., legacy 802.11p devices) as standalone messages and is understood by newer standard devices (e.g., NGV devices) by combining messages during the decoding.

Figure 7:
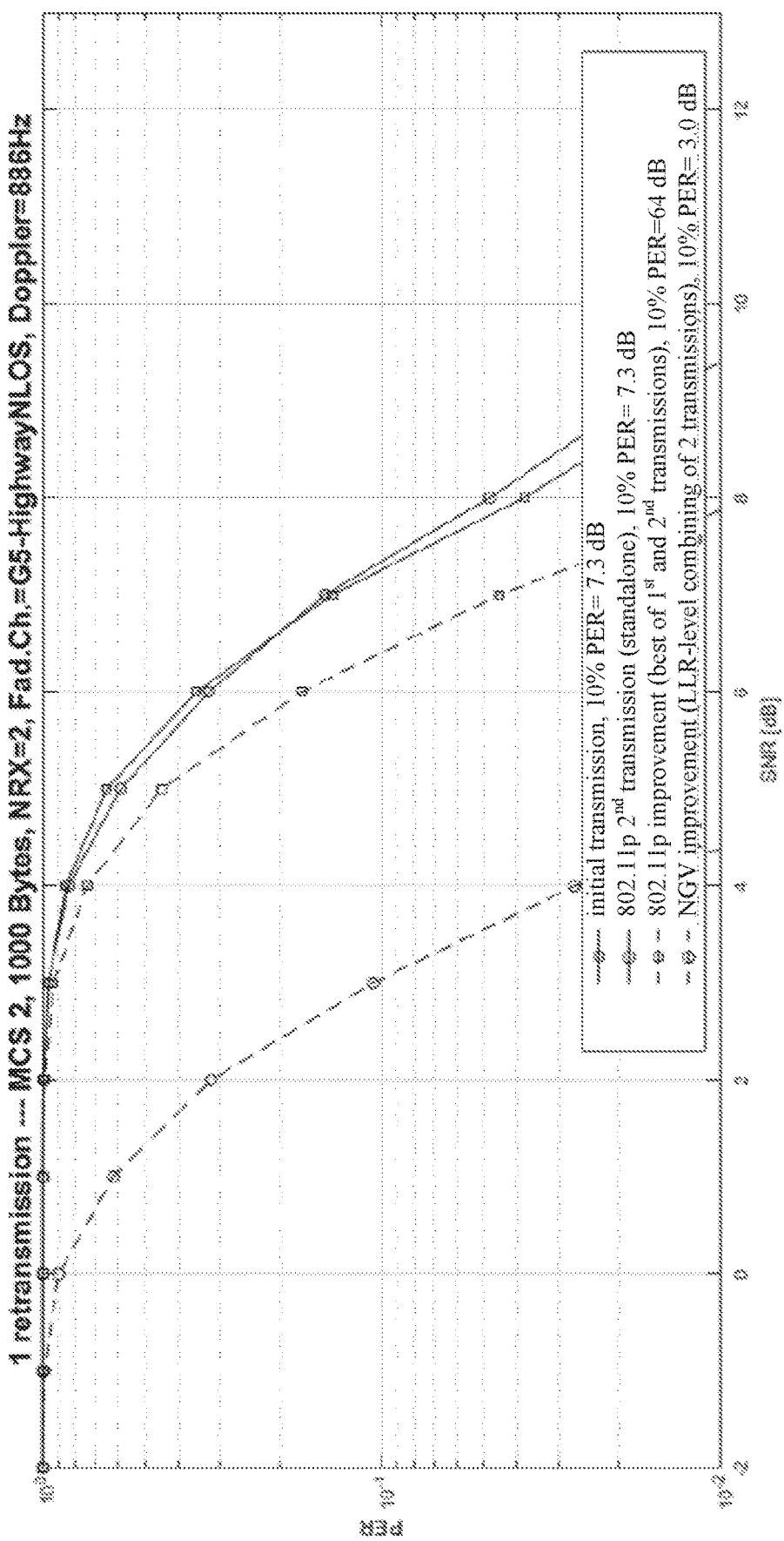
FIG. 7 is a graph illustrating example improved wireless communication performance, in accordance with various embodiments.

FIG. 7 is a graph illustrating example improved wireless communication performance, in accordance with various embodiments. More specifically, FIG. 7 illustrates example results from an implementation in which one message is sent by a transmitter, then goes through additive white Gaussian noise (AWGN) and a fading channel model (such as, the ITS G5 highway non-line-of-sight with a Doppler of 886 Hz). The packet is encoded with the typical modulation and coding scheme (MCS 2), and has a size of 1000 Bytes. There is one initial message and one retransmission. The receiver has two receive antennas and the typical elements of a receiver.

There are four curves in the plot. The first two curves, which are in a solid-line, show the standalone decoding performance. The two curves have an almost identical shape. The next two curves, in dotted-lines, show example improvement, in accordance with specific embodiments. The first dotted-line curve shows an example improvement for legacy 802.11p devices by taking the better of the two (still standalone decoding) chances. A gain of about 1 dB is seen due to temporal channel diversity. The other dotted-line curve shows the improvement for NGV devices, where two transmissions are combined (in this case, at LLR level). A gain of about 4 dB of improvement is seen and is due to the advanced combining.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 220, 225, 232 of FIG. 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 2, 3A-3B, and 4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIG. 1 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first vehicular communications circuitry operating according to a (older) standard" and "second vehicular communications circuitry operating according to the (older) standard" etc., where the [type of structure] might be replaced with terms such as "communications circuitry operating according to the (older) standard" the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to broadcast . . . " is interpreted as "circuit configured to broadcast . . . ").

It is noted that the embodiments above have been described with reference to different subject-matters. In particular, some embodiments may have been described with reference to method-type features/aspects. Whereas other embodiments may have been described with reference to an apparatus features/aspects. However, a person skilled in the art will gather from the above that, unless otherwise indicated, in addition to any combination of features/aspects belonging to one type of subject-matter, also any combination of features/aspects relating to different subject-matter, in particular a combination of features/aspects of the method-type subject-matter and features/aspects of the apparatus-type subject-matter, is considered to be disclosed with this document.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, first vehicular communications circuitry can include more or less circuit components than those illustrated by FIGS. 3A-3B and/or different ordered circuit components. As another example, second vehicular communications circuitry can include more or less circuit components than those illustrated by FIG. 4 and/or different ordered circuit components. Such modifications do not depart from the true spirit and scope of various aspects of the disclosure, including aspects set forth in the claims.

What is claimed is:

1. A method for communicating by vehicular communications circuitry of a device, comprising:

in a wireless communications network in which a message is broadcasted by vehicular communications circuitry of a device for asynchronous receptions by other circuitry in one or more devices configured to wirelessly communicate according to a communications protocol, monitoring a channel busy ratio associated with channels in a designated range of frequency pertaining to the wireless communications network; and assessing whether to retransmit the message as a function of the channel busy ratio, and in response to the channel busy ratio being outside a threshold, retransmitting the message according to the communications protocol, wherein the message is retransmitted a threshold period of time after the broadcast of the message.

2. The method of claim 1, further including retransmitting the message in response to the channel busy ratio being below the threshold which is indicative of channel congestion, the threshold being defined in the communications protocol.

3. The method of claim 1, wherein the communications protocol includes a WiFi-based or 802.11p protocol, and retransmitting the message increases at least one of a measure of message transmission range and a measure of message transmission reliability, relative to the message not being retransmitted.

4. The method of claim 1, wherein the function of the channel busy ratio corresponds to a relative extent of spectrum use involving transmissions according to the communications protocol, and wherein the function of the channel busy ratio is provided for dynamic access by using at least one of: a correlation look-up table stored in a nonvolatile memory and via a logic circuitry executing a retransmission algorithm based on the monitored channel busy ratio.

5. The method of claim 1, further including the other circuitry wirelessly communicating by using the communications protocol and operating according to an older standard or set of specifications, wherein the broadcast of the message and the retransmitting of the message by the vehicular communications circuitry is in accordance with the communications protocol and the vehicular communications circuitry is operating according to a newer standard or set of specifications having improved features compared to the older standard or set of specifications, wherein the improved features cause an extended range of communications between circuitries.

6. The method of claim 1, wherein the step of assessing includes using a mapping that correlates multiple intervals of the channel busy ratio to different numbers of retransmissions of the message.

7. The method of claim 1, further including decoding, by at least one of the other circuitry that operates according to an older standard or set of specifications, the message in each broadcast as standalone messages and filtering duplicates of the standalone messages, wherein the vehicular communications circuitry operates according to a newer standard or set of specifications having improved features compared to the older standard or set of specifications.

8. The method of claim 7, further including using, by the at least one of the other circuitry that operates according to the older standard or set of specifications, the message among the standalone messages having a highest quality and filtering the remaining duplicates of the message.

9. The method of claim 1, further including decoding, by at least one of the other circuitry that operates in accordance with a newer standard or set of specifications, the message in each broadcast as standalone messages and combining the standalone messages, wherein the newer standard or set of specifications has improved features compared to an older standard or set of specifications, and the newer and older standards or sets of specifications are associated with common communications protocols.

10. The method of claim 9, wherein combining the standalone messages includes performing at least one of: combining at an equalized symbol level, combining at an equalizer input level, combining at log-likelihood ratios (LLRs), and combining at antenna data.

11. The method of claim 9, further including determining, by the at least one of the other circuitry that operates in accordance with the newer standard or set of specifications, if incoming messages are retransmissions by performing at least one of: determining if the message is sent back-to-back with a previous message, comparing data in a preamble between messages, and comparing a scrambling sequence index of a data symbol between messages.

12. The method of claim 1, further including the other circuitry wirelessly communicating by using the communications protocol and operating according to a standard or a set of specifications, and further including broadcasting the message and retransmitting the message by the vehicular communications circuitry operating according to another standard or another set of specifications having improved features compared to the standard or the set of specifications, wherein the improved features cause an extended range of wireless communications between circuitries.

13. The method of claim 1, wherein the message is retransmitted at least twice, wherein the message is the same for the broadcast and each retransmission.

14. A vehicular communications apparatus, comprising:
first vehicular communications circuitry including at least one communications circuit configured in a device and configured to communicate wirelessly in a wireless communications network in which a message is broadcast for asynchronous receptions by other circuitry in one or more devices by:
broadcasting the message for asynchronous receptions by the other circuitry in one or more devices configured to wirelessly communicate according to a communications protocol;
monitoring a channel busy ratio associated with channels in a designated range of frequency pertaining to the wireless communications network;
assessing whether to retransmit the message as a function of the channel busy ratio, and in response to the channel busy ratio being outside a threshold, retransmitting the message according to the communications protocol;
assessing whether a second message and a third message received from one of the other circuitry are part of a retransmission series; and
in response to determining the second and third messages are part of the retransmission series, decode and combine, using an accumulator circuit, the second and third messages, wherein the first vehicular communications circuitry operates in accordance with a newer standard or set of specifications having improved features compared to an older standard or set of specifications operated by at least one of the other circuitry, and wherein both the newer and older standards or sets of specifications are associated with common communications protocols.

15. The apparatus of claim 14, wherein the first vehicular communications circuitry is further configured and arranged to retransmit the message in response to the channel busy ratio being below the threshold that is indicative of channel congestion, which increases at least one of a measure of message transmission range and a measure of message transmission reliability, relative to the message not being retransmitted, the threshold being defined in the communications protocol.

16. The apparatus of claim 14, wherein the first vehicular communications circuitry is configured and arranged to not retransmit the message in response to the channel busy ratio being above the threshold which is indicative of channel congestion.

17. The apparatus of claim 16, further including a second vehicular communications circuitry including at least one communications circuit configured in another device and configured to communicate wirelessly in the wireless communications network by:
receiving and decoding, by the second vehicular communications circuitry that operates according to an older standard or set of specifications, the message and retransmitted message as standalone messages and filtering duplicates of the standalone messages, and
wherein the first vehicular communications circuitry operates in accordance with a newer standard or set of specifications having improved features compared to the older standard or set of specifications.

18. The apparatus of claim 14, wherein the first vehicular communications circuitry is configured and arranged to:
determine whether the second and third messages are part of the retransmission series by comparing data between the second and third messages; and
in response to the third message being received within a threshold time of receiving the second message, skip the third message in the retransmission series.

19. A method for communicating by vehicular communications circuitry of a device, comprising:
in a wireless communications network in which a message is broadcasted by vehicular communications circuitry of a device for asynchronous receptions by other circuitry in one or more devices configured to wirelessly communicate according to a communications protocol, monitoring a channel busy ratio associated with channels in a designated range of frequency pertaining to the wireless communications network; and assessing whether to retransmit the message as a function of the channel busy ratio, and in response to the channel busy ratio being outside a threshold, retransmitting the message according to the communications protocol, wherein the message is retransmitted at least twice, wherein the message is the same for the broadcast and each retransmission.

20. The method of claim 19, wherein the communications protocol includes a WiFi-based or 802.11p protocol, and retransmitting the message increases at least one of a measure of message transmission range and a measure of message transmission reliability, relative to the message not being retransmitted.

* * * * *